United States Patent [19]
Yamate et al.

[11] Patent Number: 5,182,497
[45] Date of Patent: Jan. 26, 1993

[54] CATHODE CLAMPING CIRCUIT APPARATUS WITH DIGITAL CONTROL

[75] Inventors: Kazunori Yamate; Hideo Kinoshita, both of Osaka; Chikara Uenishi, Chigasaki; Masafumi Ugajin; Shinichi Kidokoro, both of Fujisawa; Hiroshi Yamagiwa, Kamakura, all of Japan

[73] Assignee: Matsushita Electric Industrial Co., Ltd., Osaka, Japan

[21] Appl. No.: 841,090

[22] Filed: Feb. 25, 1992

[30] Foreign Application Priority Data

Feb. 27, 1991 [JP] Japan .................................. 3-32796

[51] Int. Cl.5 .................................. H01J 29/52
[52] U.S. Cl. .................................. 315/383; 358/172
[58] Field of Search .......................... 315/383; 358/172

[56] References Cited

U.S. PATENT DOCUMENTS 3,970,895  7/1976  Willis .................................. 315/383

Primary Examiner—Theodore M. Blum
Attorney, Agent, or Firm—Pollock, VandeSande & Priddy

[57] ABSTRACT

A cathode clamping circuit apparatus with digital control comprises; a variable voltage source for generating the bright voltage and cathode clamping circuits for producing dc component voltages for color component signals respectively. Each of the cathode clamping circuits has: a capacitor for coupling one of color component signals to an output terminal; the shunt regulator for generating the sub-bright voltage in accordance a current signal, the bright and the sub-bright voltages being summed to produce the dc component voltages by connecting the variable voltage source to the shunt regulator in series; the variable current source for producing the current signal in accordance with a voltage signal; a d/a converter responsive to a control signal for producing the voltage signal; a transistor for clamping the color component signal with the sum voltage of the bright voltage and sub-bright voltages in response to the clamp pulse produced from the color component signals R, G. and B and the vertical and horizontal synchronizing pulse accompanied with the color component signals. Removal of variable resistors eliminates poor contact therein and contributes automatization of the cathode clamping circuit.

5 Claims, 3 Drawing Sheets $$V_{KA} = V_{REF}\left(1 + \frac{R21}{R22}\right) + I_{REF} \cdot R21$$

$$I_{REF} \ll 1$$

CATHODE CLAMPING CIRCUIT APPARATUS WITH DIGITAL CONTROL

BACKGROUND OF THE INVENTION

1. Field of the Invention

This invention relates to a cathode clamping circuit apparatus for clamping cathode beam currents of color signals with differences in intensities among the beam currents compensated.

2. Description of the Prior Art

A cathode clamping circuit apparatus is known which produces dc voltage components for color signals supplied to a cathode ray tube (CRT) and clamps the color signals with the dc voltages respectively. A voltage of the dc voltage component for each color component signal is obtained from the sum of a bright voltage and sub-bright voltage. The bright voltage is commonly used for all color component signals. While the sub-bright voltages are individually trimmed for respective color component signals. The bright voltage is manually changed by a bright control variable resistor. The sub-bright voltages are changed by sub-bright control variable resistors respectively. That is, the cathode clamping apparatus comprises a variable voltage source for producing a bright voltage and a set of cathode clamping circuit for clamping respective color signals with sum voltages of the bright and sub-bright voltages respectively. The set of cathode clamping circuits for color signals, for example, red (R), green (G), and blue (B), are trimmed to determine a black level of a color CRT. That is, the cathode clamping circuit apparatus compensates difference among CRT beam current of R, G, and B to reproduce the black level suitably.

FIG. 2 is a schematic circuit diagram of such a cathode clamping circuit apparatus 55 of a prior art. The cathode clamping circuit apparatus 55 produces dc voltage components of color signals applied to a color CRT. The voltage value of each of dc voltages is obtained from a sum of the bright voltage common to respective color signals and the sub-bright voltage for compensating differences in intensity among beam currents of R, G, and B as mentioned above. It is necessary that the bright voltage should be changed commonly among R, G, and B and the sub-bright voltages are changed individually. Therefore, each of the dc voltage components is changed with a variable resistor 21, connected between a cathode of the shunt regulator and a reference input thereof. The sums of bright voltage and the sub-bright voltages are trimmed to determine a black level on the CRT. Therefore, at least two cathode clamping circuits are necessary to adjust the black level. A transistor 6 clamps a color component signal with the sum voltage of a bright voltage and a sub-bright voltage when the clamp pulse generation circuit 8 detects a clamp level, pedestal level, or black level. The variable voltage source 13 generates the bright voltage. A shunt regulator 10 generates one of the sub-bright voltages.

Hereinbelow will be described a structure of the shunt regulator 10. FIG. 3 is a block diagram of the shunt regulator shown in FIG. 3 and is common to an embodiment of the invention. In FIG. 3, the shunt regulator 10 comprises a current source 33, an error amplifier 34, an output transistor 32, and a reference voltage source 35. It has a cathode terminal 38, a reference terminal 39, and an anode terminal 40. Operation of the shunt regulator 10 is as follows:

An internal reference voltage source 35 is connected to an inverting input of the error amplifier 34. A reference input terminal 39 is connected to a non-inverting input terminal of the error amplifier 34. The error amplifier 34 so produces an output as to maintain a balance between inverting and non-inverting input. The output of error amplifier 34 is applied to the output transistor 32 to control the output transistor 32.

In this state, a voltage value $V_{KA}$, that is, a sub-bright voltage value of the cathode terminal 38 of the shunt regulator 10 is given by:

$$V_{KA} = V_{REF}(1 + R_{21}/R_{22}) + I_{REF} R_{21}$$

when the anode terminal 40 of the shunt regulator 10 is grounded and a non-inverting input current $I_{REF} << 1$. The reference $R_{21}$ shows a resistance of the resistor 22 and the reference $R_{22}$ shows a resistance of the resistor 21.

Here, the term $I_{REF} R_{21}$ can be neglected if the resistance $R_{21}$ is assumed tens kilo-ohms because in the actual circuit, the order of $I_{REF}$ is assumed several microamperes. This is because the error amplifier 34 is used as a non-inverted type. Therefore, the voltage value $V_{KA}$ is given by:

$$V_{KA} = V_{REF}(1 + R_{21}/R_{22})$$

The voltage value $V_{KA}$ can be changed in accordance with the resistance of the variable resistor 21.

In the cathode clamping circuit apparatus 55 using the variable resistor 21 as mentioned in the prior art, there are problems, namely a decrease in reliability due to poor contact at the variable resistor 21. This is due to the fact that the variable resistor 21 has a mechanical structure and it is difficult to realize automation of trimming the variable resistor 21 at a factory. The presence of the variable resistor 21 is an obstacle factor in trimming at a factory.

SUMMARY OF THE INVENTION

The present invention has been developed in order to remove the above-described drawbacks inherent to the conventional cathode clamping circuit apparatus.

According to the present invention there is provided a cathode clamping circuit apparatus comprising: a variable voltage source for generating the bright voltage and cathode clamping circuits for producing dc component voltages for color component signals respectively. Each of the cathode clamping circuits has: a coupling capacitor for coupling the color component signal R to an output terminal; the shunt regulator for generating the sub-bright voltage $V_{KA}$ in accordance with a current signal, the bright $V_B$ and the sub-bright $V_{KA}$ voltages being summed to produce the dc component voltages by connecting the variable voltage source to the shunt regulator in series; the variable current source for producing the current signal in accordance with a voltage signal; a d/a converter responsive to a control signal for producing the voltage signal; a transistor for clamping the color component signal with the sum voltage of the bright voltage and sub-bright voltages in response to the clamp pulse produced from the color component signals R, G, and B and the vertical and horizontal synchronizing pulse accompanied with the color component signals R, B, and R.

According to the present invention there is also provided a cathode clamping circuit apparatus comprising: a variable voltage source for generating the bright voltage $V_B$ and cathode clamping circuits for producing dc component voltages for color component signals and for clamping the color component signals with the produced dc component voltages respectively. Each of the cathode clamping circuits has:

a first capacitor whose one end is supplied with one of color component signals, for coupling one of the color component signals to the output terminal; a first resistor whose one end is connected to the output terminal and whose other end is supplied with the dc supply voltage; a transistor having a collector connected to the output terminal, a base supplied with the clamp pulse, and an emitter; a second capacitor whose one end is connected to the emitter and whose another end is connected to the ground; a shunt regulator for generating the sub-bright voltage $V_{KA}$ in accordance with a current signal, the shunt regulator having: a cathode terminal connected to the emitter; a reference terminal; and an anode terminal supplied with the bright voltage $V_B$, the shunt regulator outputting a sum voltage of the bright voltage $V_B$ and the sub-bright voltage $V_{KA}$ because the anode is supplied with the bright voltage $V_B$; the second resistor whose one end is connected to the emitter and whose other end is supplied with the supply voltage; the third resistor connected between the cathode of the shunt regulator and the reference terminal; a fourth resistor connected between the reference terminal and the anode terminal; a voltage control type current source for generating the current signal in accordance with a voltage signal; a d/a converter for generating the voltage signal in accordance with the control signal, wherein the transistor clamps the color component signal with the sum voltage of the bright voltage and the sub-bright voltage and the decoupling capacitor decouples the sum voltage.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Figure 1:
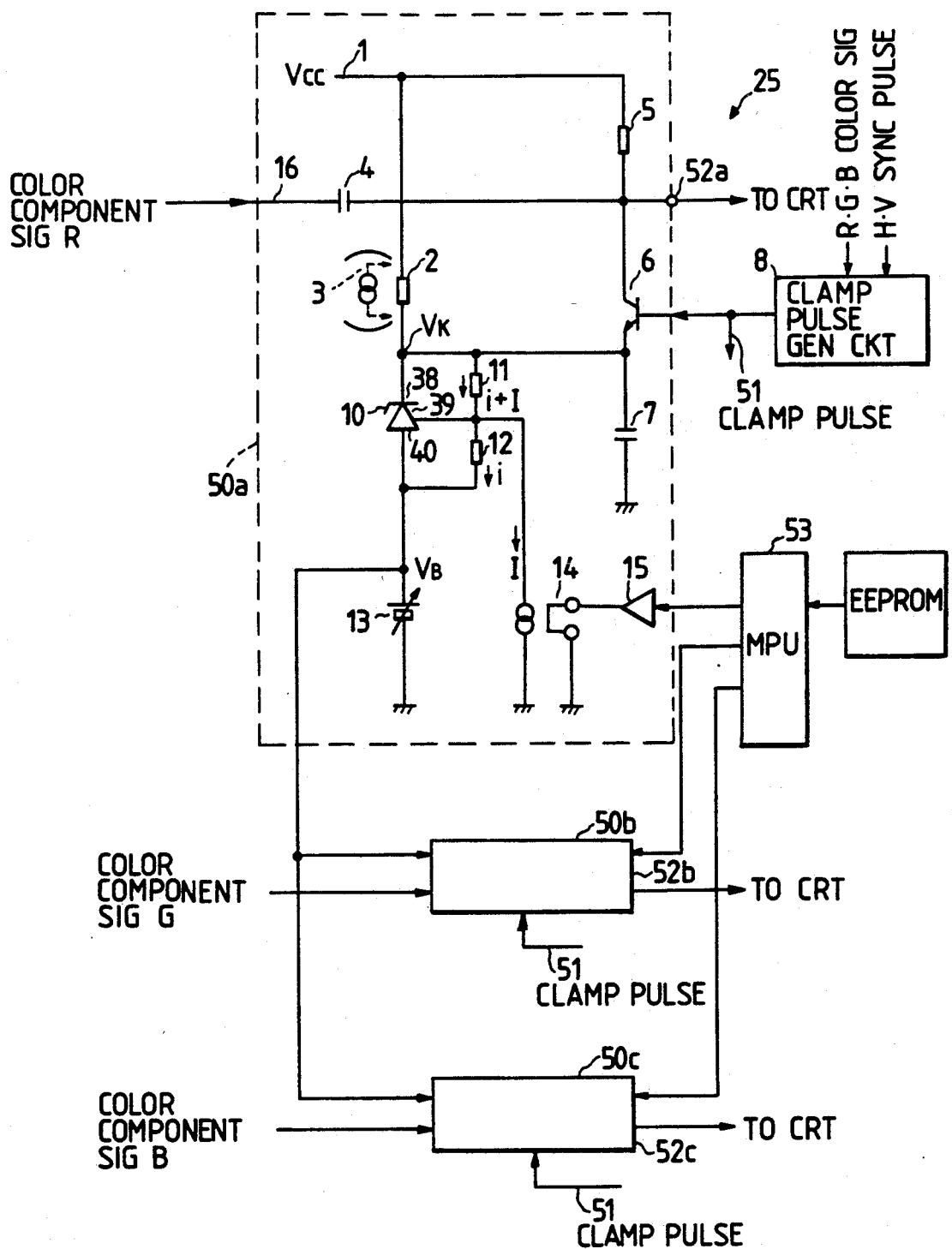
FIG. 1 is a block diagram of a cathode clamping circuit apparatus of an embodiment of this invention.
Figure 2:
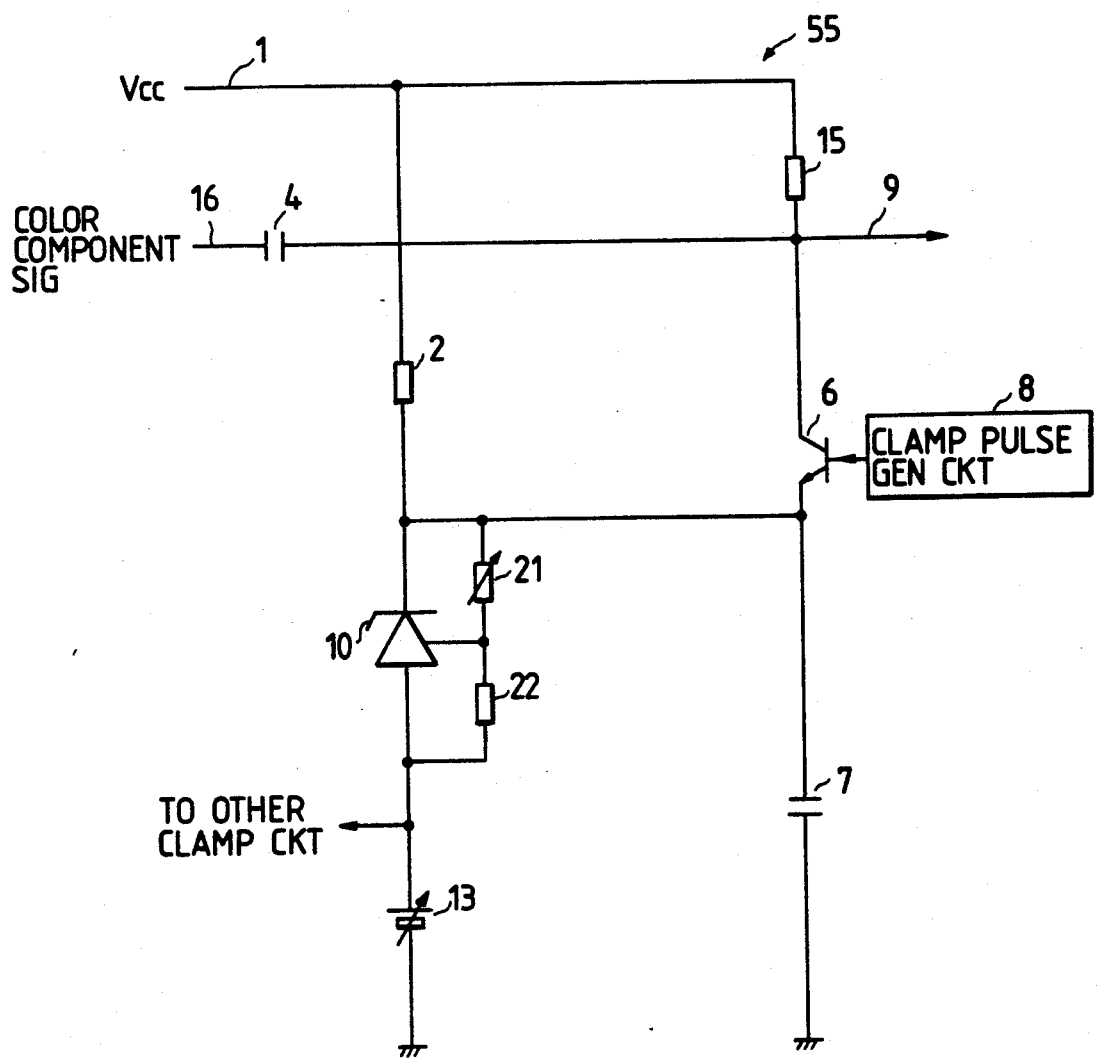
FIG. 2 is a block diagram of a cathode clamping circuit apparatus of a prior art.
Figure 3:
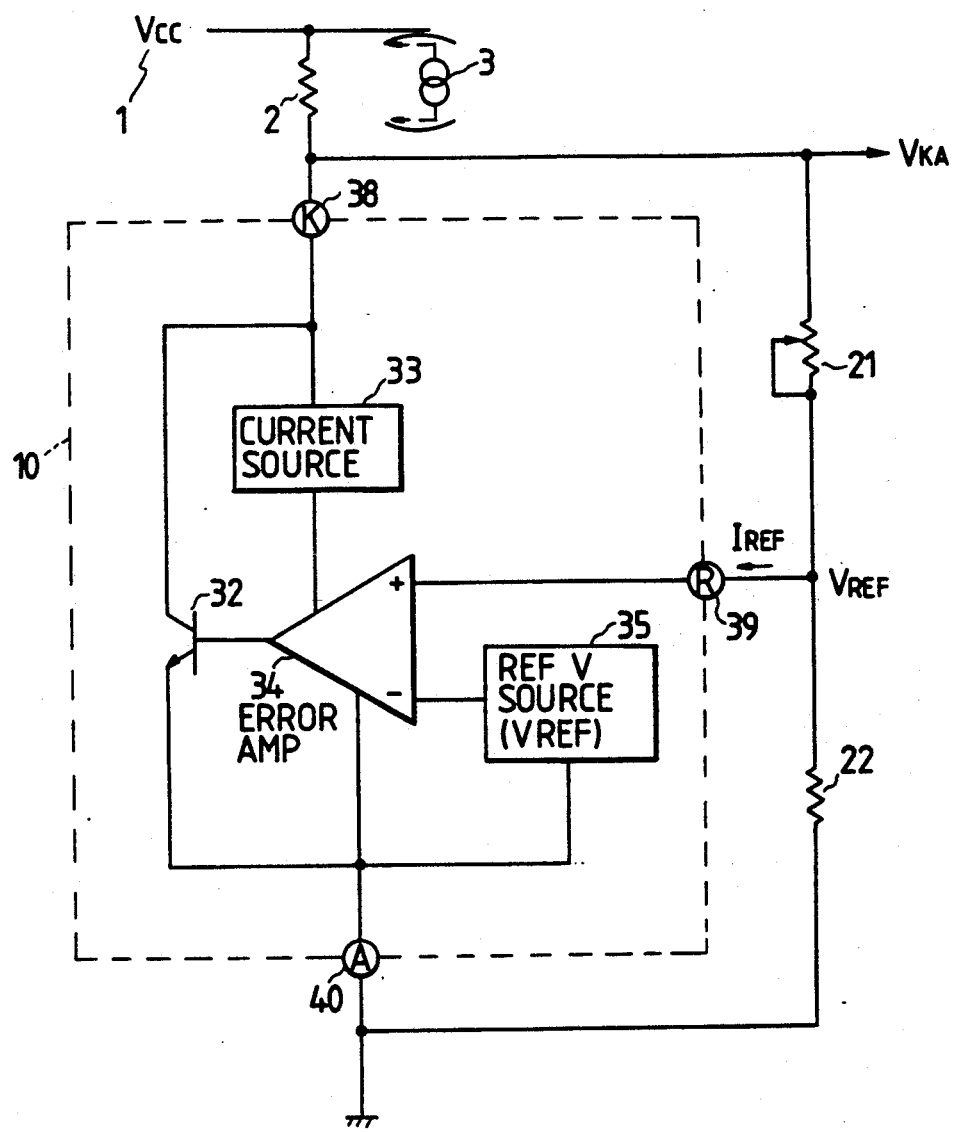
FIG. 3 is a block diagram of a shunt regulator of a prior art shown in FIG. 2 and which is commonly used for the embodiment shown in FIG. 1.

Hereinbelow will be described an embodiment of this invention with reference to drawings. FIG. 1 is a block diagram of a cathode clamping circuit apparatus 25 of the embodiment of this invention. FIG. 3 is a block diagram of a shunt regulator shown in FIG. 1 which is commonly used in the prior art shown in FIG. 2.

The cathode clamping circuit apparatus 25 comprises a variable voltage source 13 for generating a dc voltage, that is, a bright voltage $V_B$ in accordance with manual operation and cathode clamping circuits 50a, 50b, and 50c supplied with the bright voltage $V_B$. The cathode clamping circuits 50a, 50b, and 50c produce dc voltage components of color signals of red (R), green (G), and blue (B) and clamp color component signals R, G, and B with the produced dc voltage components respectively. The dc voltage components of respective color signals R, G, and B are determined in accordance with a black level of a not-shown color cathode ray tube (CRT). That is, cathode clamping circuits 50a, 50b, and 50c compensate differences among CRT beam currents of R, G, and B.

Each of the cathode clamping circuits 50a, 50b, and 50c has a function that a dc voltage component of a color signal applied to the color CRT is produced. A dc voltage value of the produced dc voltage component is a sum of the bright voltage $V_B$ which is common to respective colors component signals R, G, and B and a dc voltage, that is, sub-bright voltage, for compensating differences in intensity among CRT beam currents of R, G, and B. The bright voltage $V_B$ is used commonly for color component signals R, G, and B and the sub-bright voltages are changed individually. Therefore, each of the sub-bright voltages for color signals R, G, and B to be clamped can be changed. The sums of the bright voltage and the sub-bright voltages are trimmed to determine a black level on the CRT. Therefore, at least two cathode clamping circuits are trimmed to adjust the black level. In the cathode clamping circuit 50a, a transistor 6 clamps a color component signal R with the sum voltage of bright voltage and sub-bright voltage when the clamp pulse generation circuit 8 detects a clamp level, pedestal level, or black level. The sub-bright voltage is generated by a shunt regulator 10 in accordance with a current signal generated by a voltage-controlled type current source (variable current source) 14. The current signal is generated by a d/a converter 15 in accordance with a control signal from the microprocessor 53.

The bright voltage is generated by a variable voltage source 13 which is also sent to another cathode clamping circuits 50b and 50c for color signals G and B respectively. That is, the variable voltage source 13 is commonly used in the cathode clamping circuits 50a, 50b, and 50c. Therefore, the cathode clamping circuits 50b and 50c for the color signals of G and B have the same structure as that of cathode clamping circuit 50a. Outputs of the cathode clamping circuits 50a, 50b, and 50c are sent to the color cathode ray tube with differences among its beam currents of the color component signals R, G, and B compensated.

More specifically, the structure of this embodiment of a cathode clamping circuit apparatus is as follows:

It comprises: a variable voltage source 13 for generating the bright voltage $V_B$ and cathode clamping circuits 50a, 50b, and 50c for producing dc component voltages for color component signals R, G, and B respectively. The cathode clamping circuits 50a, 50b, and 50c have the same structure as each other. The cathode clamping circuits 50a has: a coupling capacitor 4 for coupling the color component signal R to an output terminal 52a; the shunt regulator 10 for generating the sub-bright voltage $V_{KA}$ in accordance a current signal i, the bright $V_B$ and the sub-bright $V_{KA}$ voltages being summed to produce the dc component voltage by connecting the variable voltage source 13 to the shunt regulator 10 in series; the variable current source 14 for producing the current signal I in accordance with a voltage signal; a d/a converter 15 responsive to a control signal for producing the voltage signal; the transistor 6 for clamping the color component signal R with the sum voltage of the bright voltage $V_B$ and sub-bright voltages $V_{KA}$ in response to the clamp pulse 51 produced from the color component signals R, G, and B and the vertical and horizontal synchronizing pulse accompanied with the color component signals R, B, and R.

Hereinbelow will be the operation of the cathode clamping circuit apparatus 25 of the embodiment described.

The color component signal R is applied to the coupling capacitor 4. The coupling capacitor 4 couples the color signal R to the output terminal 52a. The variable voltage source 13 generates the bright voltage $V_B$ which is also sent to other cathode clamping circuits 50b and 50c. The shunt regulator 10 produces the sub-bright voltage in accordance with the current flowing into its reference terminal 39. The bright voltage $V_B$ and the sub-bright voltage is added because they are connected in series and sent to the transistor 6. The decoupling capacitor 7 decouples the sum voltage. The transistor 6 clamps the color signal R in response to the clamp pulse 51 applied its base terminal. The voltage control type current source 14 is connected to a junction point between the resistors 11 and 12. The voltage control type current source 14 is controlled by a dc output voltage of a D/A converter 15.

Hereinbelow will be described a structure of the shunt regulator 10. FIG. 3 is a block diagram of the shunt regulator shown in FIG. 3. In FIG. 3, the shunt regulator 10 comprises a current source 33, an error amplifier 34, an output transistor 32, and a reference voltage source 35. It has a cathode terminal 38, a reference terminal 39, and an anode terminal 40. Operation of the shunt regulator 10 is as follows:

An internal reference voltage source 35 is connected to an inverting input of the error amplifier 34. A reference input terminal 39 is connected to a non-inverting input terminal of the error amplifier 34. The error amplifier 34 produces an output so as to maintain a balance between inverting and non-inverting input. The output of error amplifier 34 is applied to the output transistor 32 to control the output transistor 32.

When the voltage control type current source 14 does not draw out a current from the resistor 11, the cathode voltage $V_{KA}$, that is sub-bright voltage, is given by:

$$V_K = V_B + V_{REF}(1+R11/R12) + R11 \cdot I_{REF}$$

If it is assumed that R11<tens kilo-ohms and $I_{REF}$=several microamperes, the term R11·Iref can be neglected.

In this condition, the cathode voltage Vka at the anode of the shunt regulator 10 is given by: $V_{KA} = V_{REF}(1+R11/R12)$. It is assumed that $V_{REF}/R_{22} = I$, a current I flows through the resistor. Thus, $V_{KA} = V_{REF} + R11 \cdot V_{REF}/R12 = V_{REF}(1+R11/R12)$.

Then, a dc voltage is applied to the voltage control type current source 14, a current i begins to flow through the resistor 11 and the voltage control type current source 14. In this condition, a voltage difference between the both ends of the resistor 11 is given by (I+i) R11 because the current i from the voltage control type current source 14 flows through the resistor 11. Thus, $V_{KA} = V_{REF}(1+R11/R12) + iR11$. Accordingly, the voltage $V_{KA}$ is the minimum when i=0 and a voltage given by the term iR1 will increase. The sum voltage of the bright voltage $V_B$ and sub-bright voltage $V_{KA}$ by the decoupling capacitor 7 and the transistor 6 clamps the color component signals with the sum voltage. As the shunt regulator, a three-terminal semiconductor element, for example, TA76431 manufactured by TOSHIBA is available. The voltage control type current source 14 may comprise an operational amplifier (not shown) and an output transistor (not shown) driven by the operational amplifier.

Each of d/a converters 15 produces the voltage signal in accordance with a control signal from a microprocessor (MPU) 53. The microprocessor 53 produces control signals for respective cathode clamping circuit 50a, 50b, and 50c using data of each CRT beam current stored in an EEPROM (electrically erasable programmable ROM) 54. The data is written in the EEPROM 54 in a factory by observing the black level reproduce on the respective CRT.

As mentioned, the cathode clamping circuit comprises:the capacitor 4 whose one end is supplied with one of color component signals, that is, the color signal R, for coupling the color component signal R to the output terminal 52a; the resistor 5 whose one end is connected to the output terminal and whose another end is supplied with the dc supply voltage Vcc 1; the transistor 6 having a collector connected to the output terminal 52a, a base supplied with the clamp pulse 51, and the emitter; the capacitor 7 whose one end is connected to the emitter and whose another end is connected to the ground; the shunt regulator 10 for generating the sub-bright voltage $V_{KA}$ in accordance with the current signal i, the shunt regulator 10 having: a cathode terminal 38 connected to the emitter; a reference terminal 39; and an anode terminal 40 supplied with the bright voltage $V_B$, the shunt regulator 10 outputting a sum voltage of the bright voltage $V_B$ and the sub-bright voltage $V_{KA}$ because the anode 40 is supplied with the bright voltage $V_B$; the resistor 2 whose one end is connected to the emitter and whose another end is supplied with the supply voltage Vcc 1; the resistor 11 whose one end is connected between the cathode 38 and the reference terminal 39; the resistor 12 connected between the reference terminal 39 and anode terminal 40, thus, the reference terminal being supplied with the bright voltage through the resistor 12; the voltage control type current source 14 for generating the current signal i in accordance with the voltage signal; the d/a converter 15 for generating the voltage signal in accordance with the control signal, wherein the transistor 6 clamps the color component signal R with the sum voltage of the bright voltage and the sub-bright voltage and the decoupling capacitor 7 decouples the sum voltage.

What is claimed is:

1. A cathode clamping circuit apparatus with digital control comprising:
 (a) first variable voltage generation means for generating a first dc voltage in accordance with manual operation; and
 (b) a plurality of cathode clamping circuits for clamping color component signal with dc component voltages respectively, each of said cathode clamping circuits having:
  a coupling capacitor for coupling one of said color component signals to an output terminal;
  second variable voltage generation means, connected to the first variable voltage generation means, for generating a second dc voltage in accordance with a current signal;

summing means for summing said first and second dc voltages to produce one of said dc component voltages;

d/a converting means responsive to a control signal for producing a voltage signal;

current signal generation means connected to the output of the d/a converter for producing said current signal in accordance with the voltage signal;

clamping means for clamping said one of said color component signals with one of said dc component voltages in response to a clamp pulse signal produced from said color component signals and synchronizing signals accompanied with said color component signals.

2. A cathode clamping circuit apparatus with digital control as claimed in claim 1 wherein said clamping means comprises a transistor whose collector is connected to said output terminal; whose emitter is supplied with said one of said dc component voltages; and whose base is supplied with said clamp pulse.

3. A cathode clamping circuit apparatus with digital control as claimed in claim 2, wherein said second variable voltage generation means comprises a shunt regulator, a first resistor, and second resistor wherein a cathode terminal of said shunt regulator is connected to said emitter and to an end of said first resistor and a reference terminal of said shunt regulator is connected to another end of said first resistor and to an end of said second resistor whose another end is connected to an anode terminal of said shunt regulator.

4. A cathode clamping circuit apparatus with digital control as claimed in claim 1 wherein said current signal generation means comprises a voltage-controlled type current source.

5. A cathode clamping circuit apparatus with digital control comprising:

first variable voltage generation means for generating a first dc voltage with respect to the ground in accordance with manual operation; and a plurality of cathode clamping circuits for producing dc component voltages and for clamping said color component signals with said dc component voltage respectively, each of said cathode clamping circuits having;

a first capacitor whose one end is supplied with one of said color component signals for coupling a color component signal to an output terminal;

a first resistor whose one end is connected to said output terminal and whose other end is supplied with a dc supply voltage;

a transistor having a collector connected to said output terminal, a base supplied with a clamp pulse produced from said color component signals and synchronizing signals accompanied with said color component signals;

a second capacitor whose one end is connected to an emitter of the transistor and whose other end is connected to the ground;

a shunt regulator for generating a second dc voltage in accordance with a current signal, said shunt regulator having: a cathode terminal connected to said emitter; a reference terminal; and an anode terminal supplied with said first dc voltage, said shunt regulator outputting a sum voltage of said first and said second dc voltages because said anode terminal is supplied with said first dc voltage;

a second resistor whose one end is connected to said emitter and whose other end is supplied with said dc supply voltage;

a third resistor whose one end is connected between said cathode terminal and said reference terminal;

a fourth resistor connected between said reference terminal and said anode terminal;

a current source for generating said current signal in accordance with a voltage signal;

a d/a converter for generating said voltage signal in accordance with an external control signal, wherein said transistor clamps said color component signal with said sum voltage of said first and second dc voltage, and wherein said second capacitor decouples said sum voltage.

* * * * *